US006479005B1

(12) United States Patent
Hsien

(10) Patent No.: US 6,479,005 B1
(45) Date of Patent: Nov. 12, 2002

(54) METHOD OF FORMING SOFT CASING SLEEVE HAVING MULTI-COLORED AND RAISED DECORATIONS

(76) Inventor: Ming-Jen Hsien, No. 21, Mu Hsin Road, Section 3, Wen Shan District, Taipei (TW)

( * ) Notice: Subject to any disclaimer, the term of this patent is extended or adjusted under 35 U.S.C. 154(b) by 0 days.

(21) Appl. No.: 09/574,249

(22) Filed: May 19, 2000

(51) Int. Cl.[7] .......................... B29C 39/12; B28B 7/22

(52) U.S. Cl. ...................... 264/219; 264/246; 264/255

(58) Field of Search ............................ 264/219, 246, 264/247, 245, 250, 255, 310, 311, 312; 206/537; 40/334; 204/246

(56) References Cited

U.S. PATENT DOCUMENTS 1,837,471 A * 12/1931 Neidich
2,147,770 A * 2/1939 Ford
3,077,692 A * 2/1963 Shea
3,294,888 A * 12/1966 Lindahl .................... 264/246
4,364,880 A * 12/1982 Howse
4,894,004 A * 1/1990 Brault
5,152,690 A * 10/1992 Todd
5,336,458 A * 8/1994 Hutchison et al.
5,529,733 A * 6/1996 Lee
5,716,566 A * 2/1998 Lee
6,238,609 B1 * 5/2001 Stecker
6,274,072 B1 * 8/2001 Naritomi
6,399,009 B1 * 6/2002 Sato et al. ................. 264/255

FOREIGN PATENT DOCUMENTS

GB 2174953 A * 11/1986

* cited by examiner

*Primary Examiner*—Jan H. Silbaugh
*Assistant Examiner*—Geoffrey P. Shipsides
(74) *Attorney, Agent, or Firm*—Dennison, Schultz & Dougherty

(57) ABSTRACT

A method of forming a soft casing sleeve having multi-colored and raised decorations is provided. The method includes steps of preparing a mold consisting of two halves, on inner surfaces of which mold cavities are symmetrically formed; providing recesses in the mold cavities on one of the two halves of mold so that these recesses are mirror images of selected words, letters or designs; laying the half of mold having the recesses in a horizontal position so that the recesses are at a horizontally lowest position relative the mold cavity in which the recesses are provided; injecting differently colored soft plastic materials into the recesses and waiting until the plastic materials in the recesses are set; closing the two halves of the mold and positioning the closed mold in an upright position; inserting a core rod in each mold cavity; injecting another amount of soft plastic material into the mold cavities and waiting until the plastic material is set; removing the core rods and separating the two halves of mold to remove the molded soft casing sleeves from the mold cavities.

1 Claim, 7 Drawing Sheets

METHOD OF FORMING SOFT CASING SLEEVE HAVING MULTI-COLORED AND RAISED DECORATIONS

BACKGROUND OF THE INVENTION

The present invention relates to a method of forming a soft casing sleeve, and more particularly to a method of forming a soft casing sleeve that has multi-colored and raised decorations spaced on the circumferential surface of the sleeve, so that the soft casing sleeve looks more attractive.

Generally, pens may be divided into two categories, namely, pens for office use and pens for general use. These two categories of pens are different in functions but both of their casings usually have words, letters or other designs imprinted or otherwise molded thereon to serve as decorations or advertising marks. There are also some pens being provided around the entire or a part of their hard casings with an additional sleeve made of a soft plastic material, such as soft PVC material . This kind of sleeve, on the one hand, creates a comfortable touch when a user holds the pen at the casing and, on the other hand, creates a different appearance of the pen. For some pens having metal casings, such soft casing sleeve may be directly molded around the metal casings. With these soft casing sleeves, words, letters or designs that are originally provided on the casings could now be shown on the soft casing sleeves put around the casings. Up to date, the words, letters or designs are shown on the soft casing sleeves by printing and do not have any thickness relative to the soft casing sleeves. These words, letters or designs printed on the soft casing sleeves could therefore have only limited decorating or advertising effect.

SUMMARY OF THE INVENTION

A primary object of the present invention is to provide a method of forming a soft casing sleeve having multi-colored and raised decorations, so that the soft casing sleeve is more attractive in its appearance to create an even better decorating and advertising effect.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
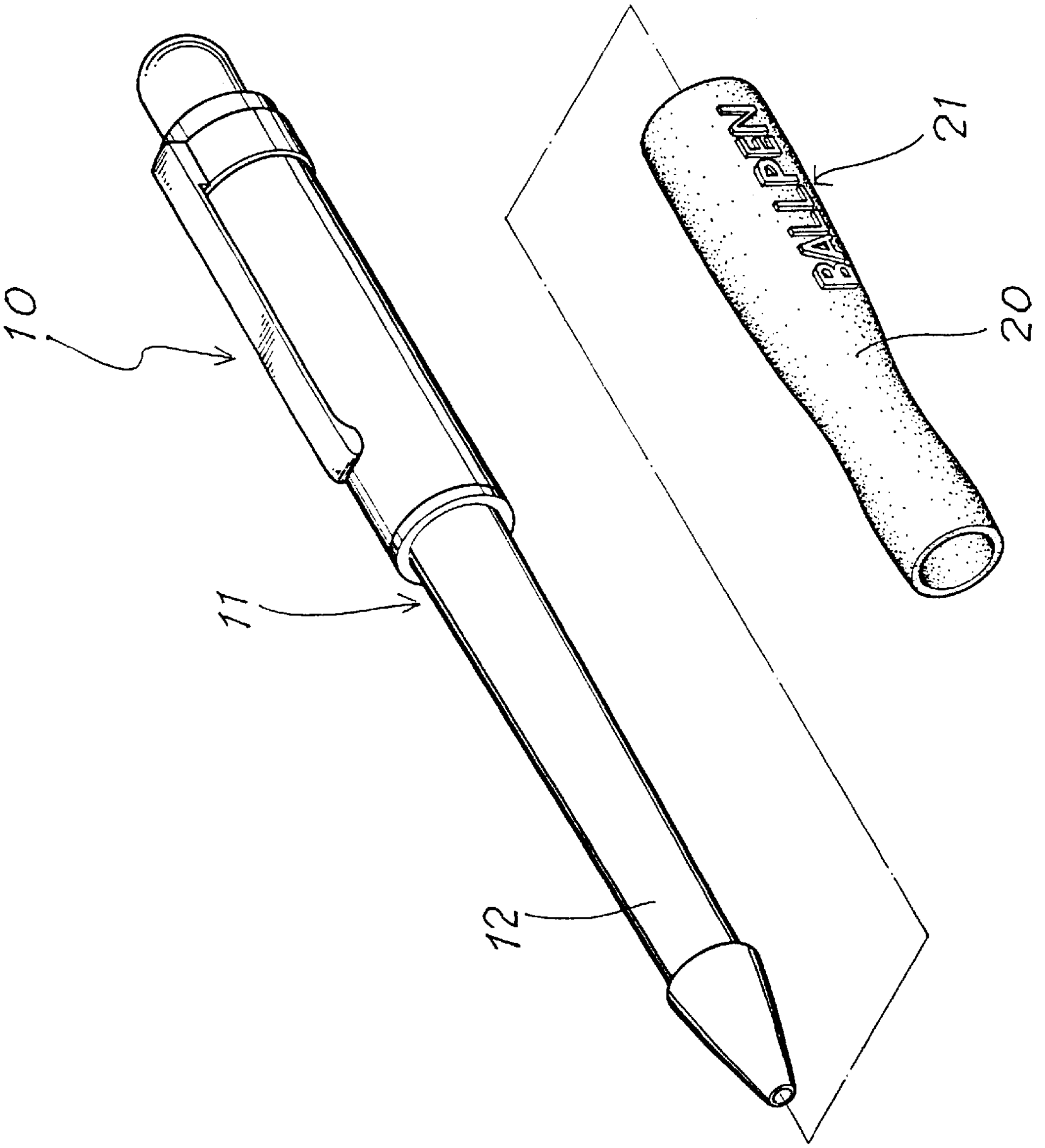
FIG. 1 is a perspective showing a soft casing sleeve formed according to the method of the present invention for putting on a pen around a casing thereof.
Figure 2:
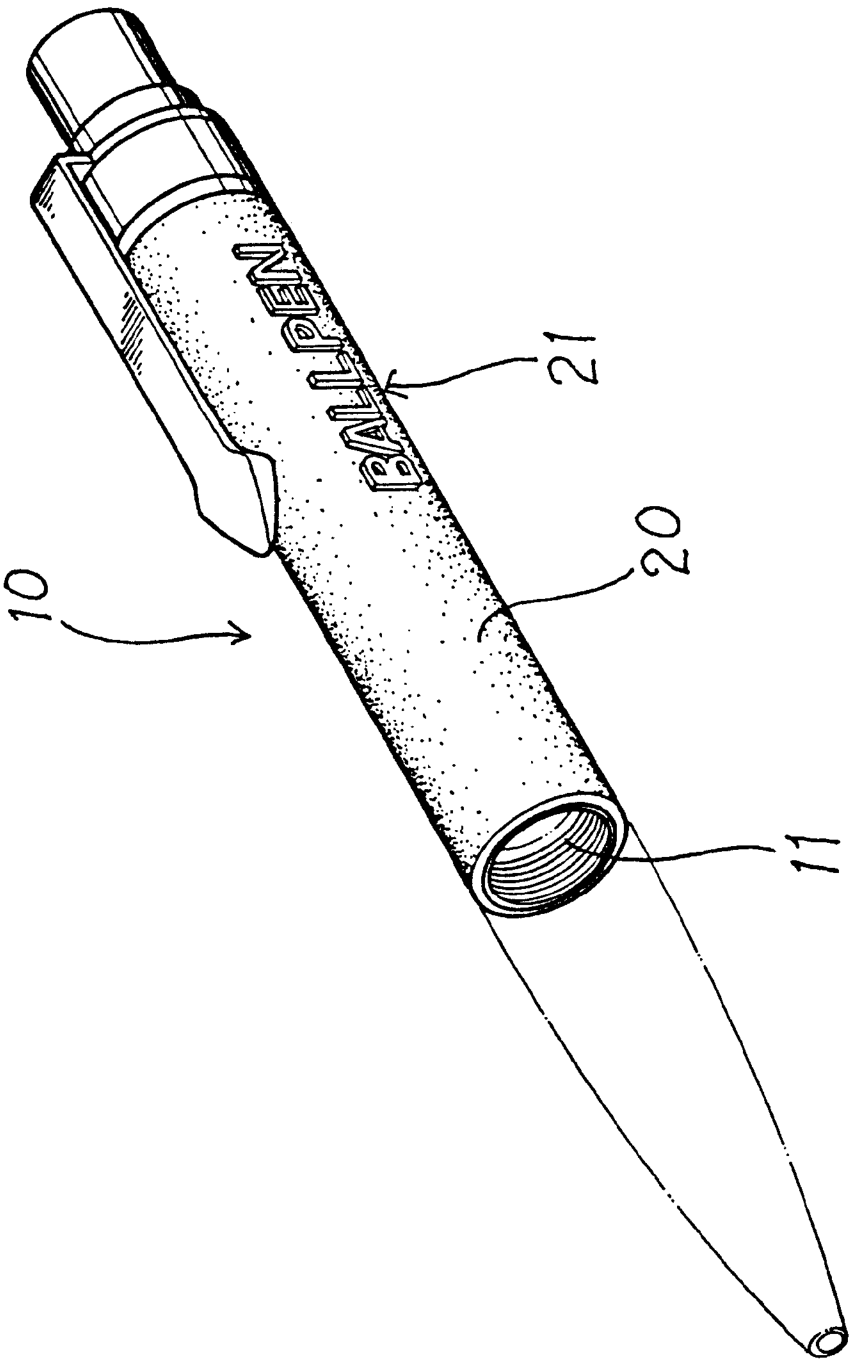
FIG. 2 is a perspective of a pen having a metal casing, around which a soft casing sleeve is directly molded in the method of the present invention.

Please refer to FIG. 1 in which a pen 10 having a casing 11 made of a hard plastic or metal material is shown. The casing 11 of the pen 10 is provided on a part of its outer surface with an outer-diameter-reduced section 12 for a soft casing sleeve 20 to put around the section 12. The soft casing sleeve 20 may be made of a soft plastic material, such as soft PVC material. In the case the pen 10 has a casing 11 made of a metal material, as shown in FIG. 2, the soft casing sleeve 20 may also be integrally molded around the metal casing 11 by directly putting the metal casing 11 in a mold for forming the soft casing sleeve 20. The soft casing sleeve 20 is provided mainly to create a comfortable touch for a user holding the pen 10 at the casing 11 and to create a unique appearance for the pen 10. On an outer surface of the soft casing sleeve 20, there may be formed of raised and multi-colored decorations 21, including letters, words and/or designs. Such raised decorations 21 may have colors different from that of the soft casing sleeve 20 to make the latter more attractive.

Figure 3:
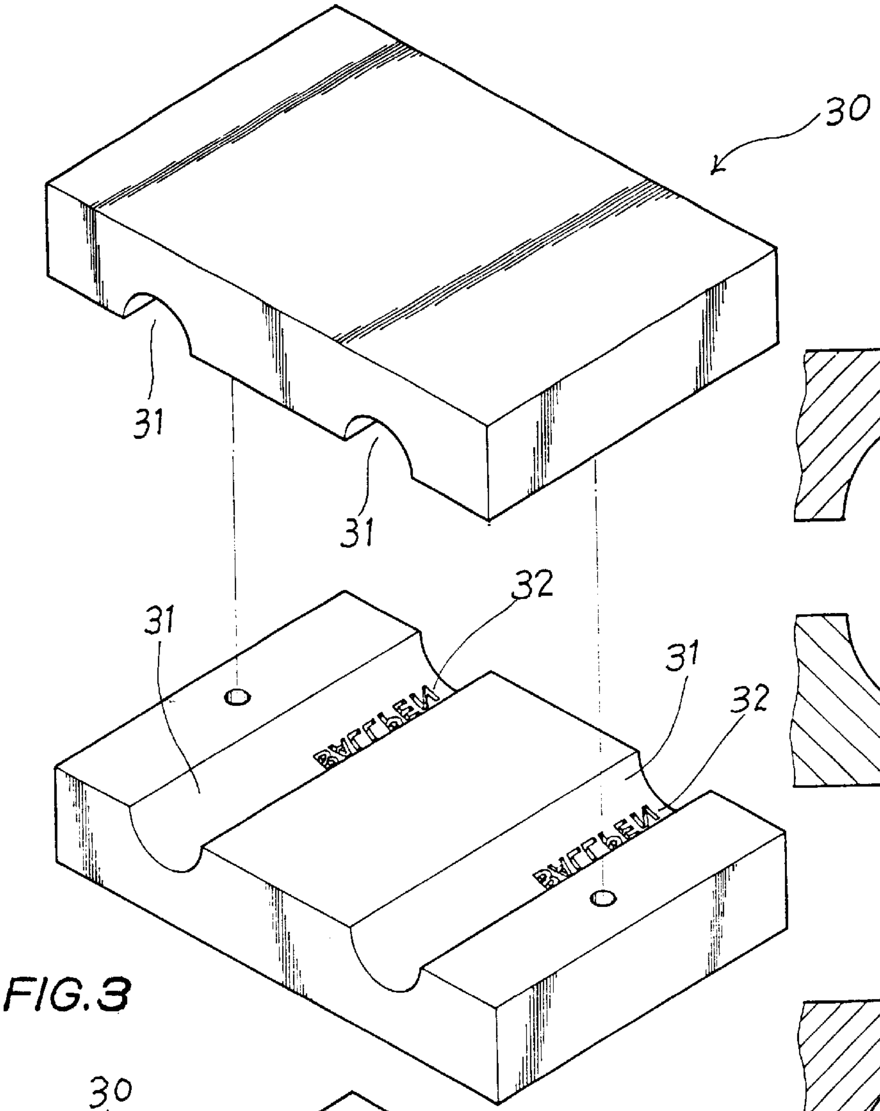
FIG. 3 illustrates a mold adopted in the method of the present invention for forming soft casing sleeves having multi-colored and raised decorations, wherein the mold is horizontally positioned with two halves thereof being separated apart.
Figure 4:
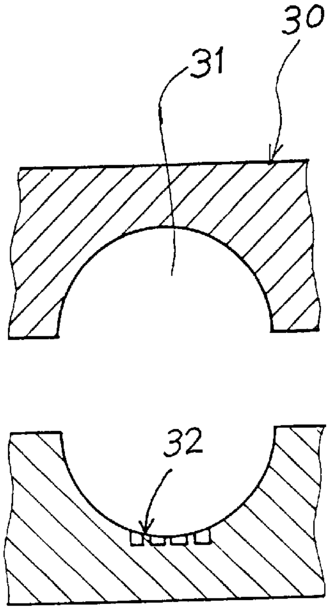
FIG. 4 is a fragmentary sectional view of the mold of FIG. 3.
Figure 5:
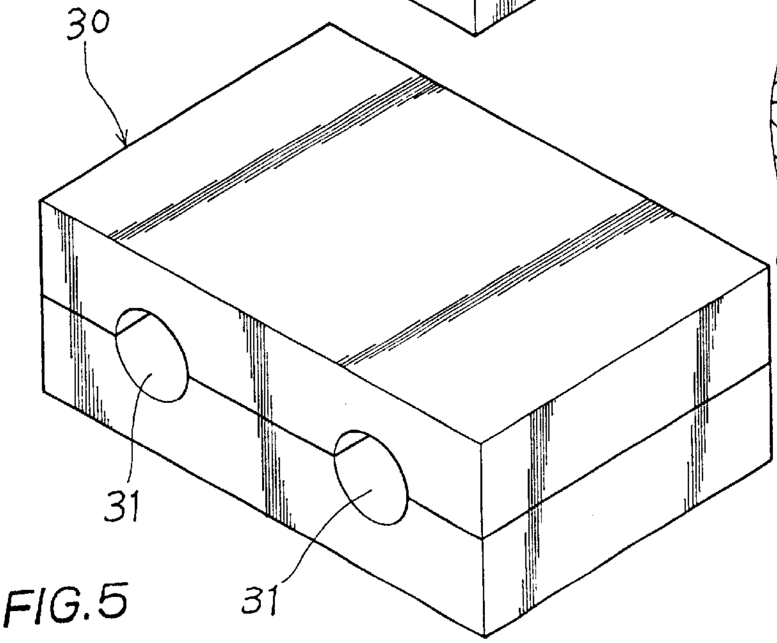
FIG. 5 is a perspective of the mold of FIG. 3 with two halves thereof in an assembled state.
Figure 6:
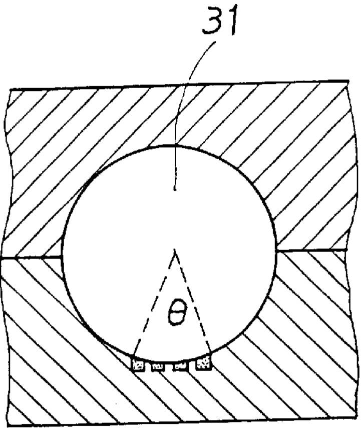
FIG. 6 is a fragmentary sectional view of the mold of FIG. 5.
Figure 8:
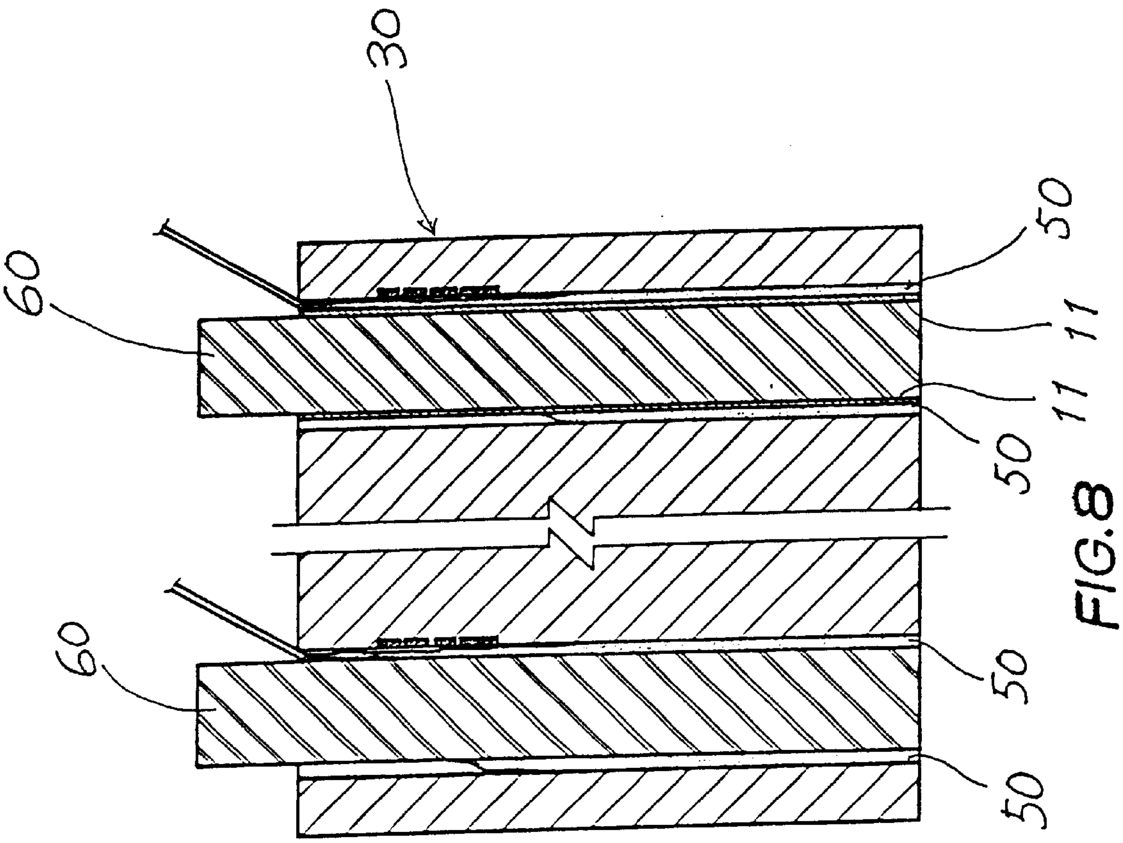
FIG. 8 is a sectional view of FIG. 7 showing the manner of injecting plastic material into the mold cavities on the mold.
Figure 7:
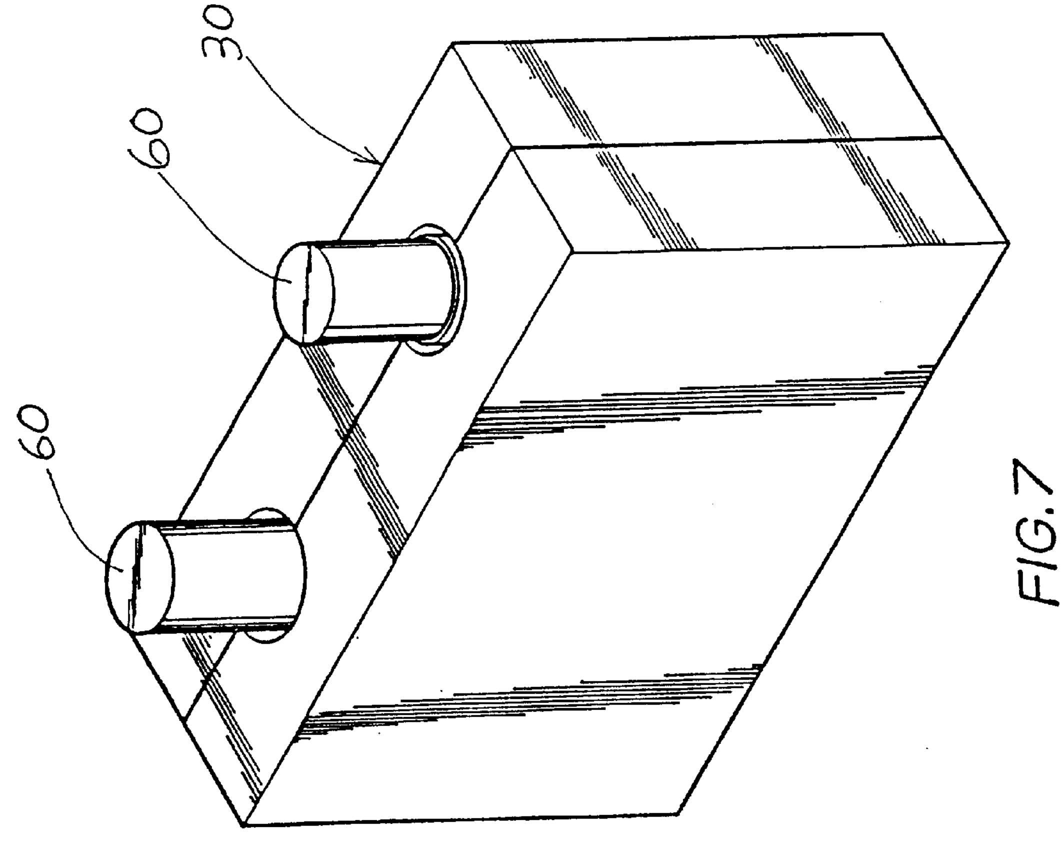
FIG. 7 is a perspective of the mold of FIG. 5 but in a vertical position with a core rod positioned in each pair of mold cavities on the mold.
Figure 9:
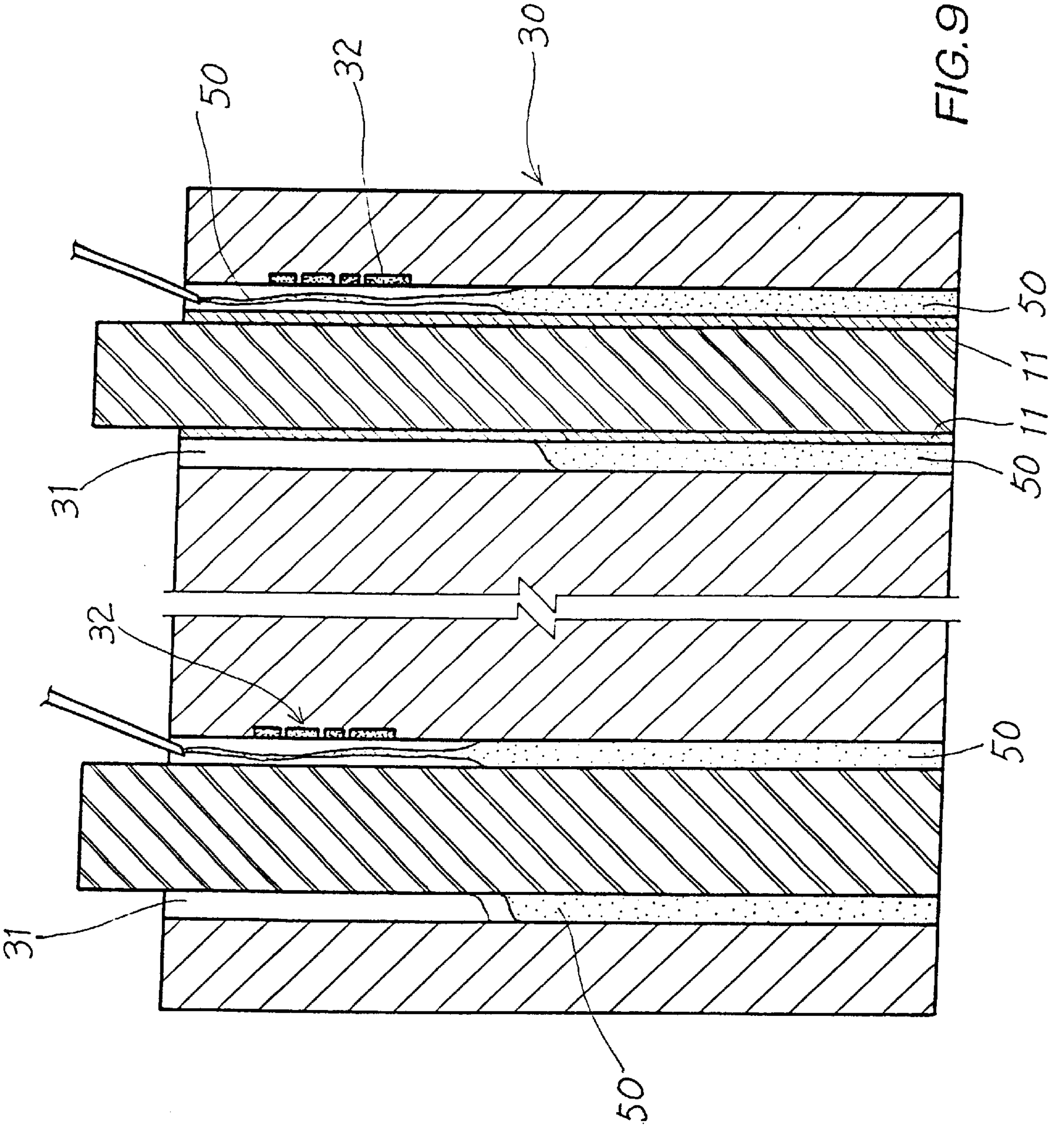
FIG. 9 is an enlarged view of FIG. 8.
Figure 11:
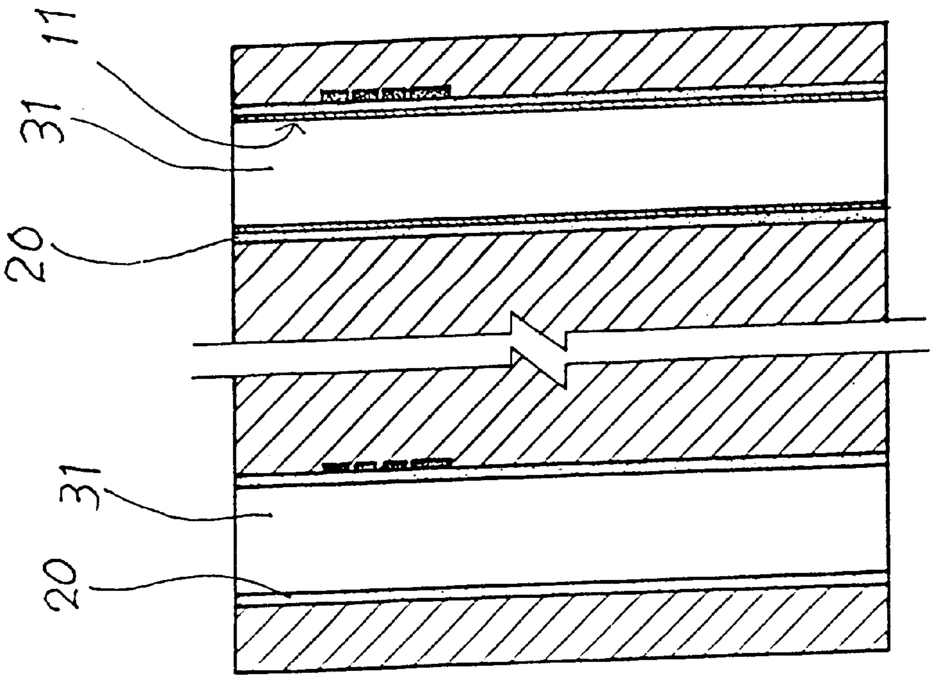
FIG. 11 is a sectional view of the mold of FIG. 10.
Figure 10:
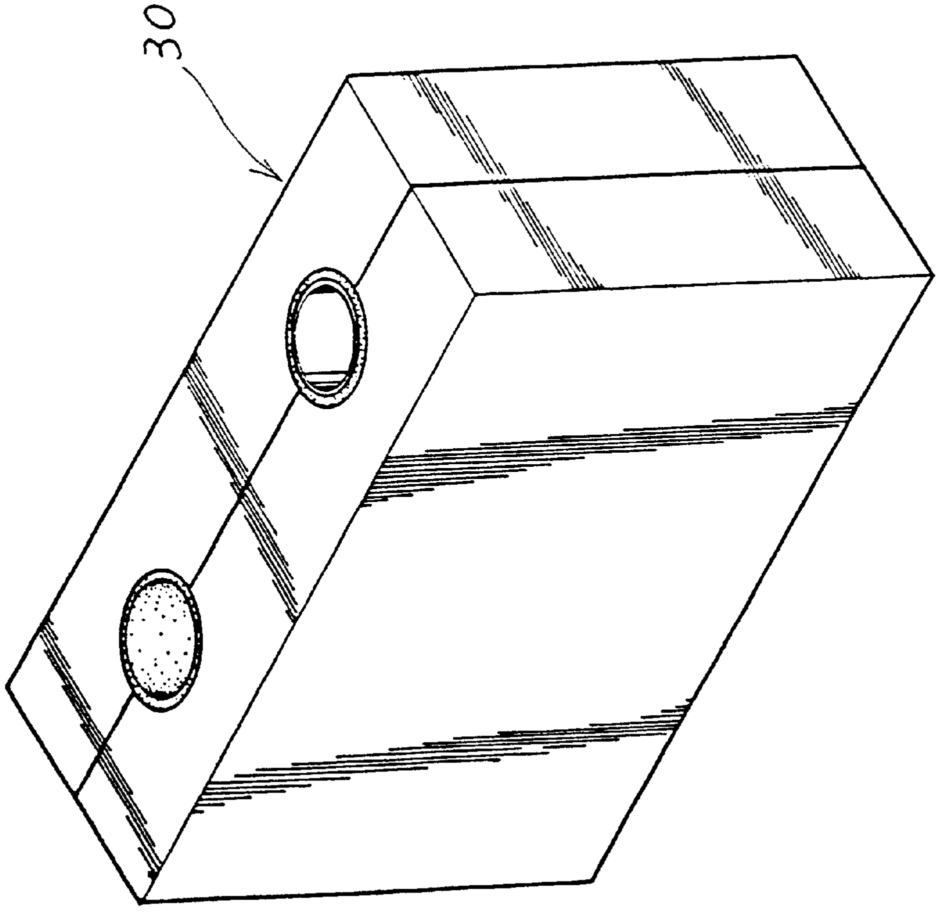
FIG. 10 shows the mold of the present invention after the plastic material injection, wherein the core rods have been removed from the mold cavities.
Figure 12:
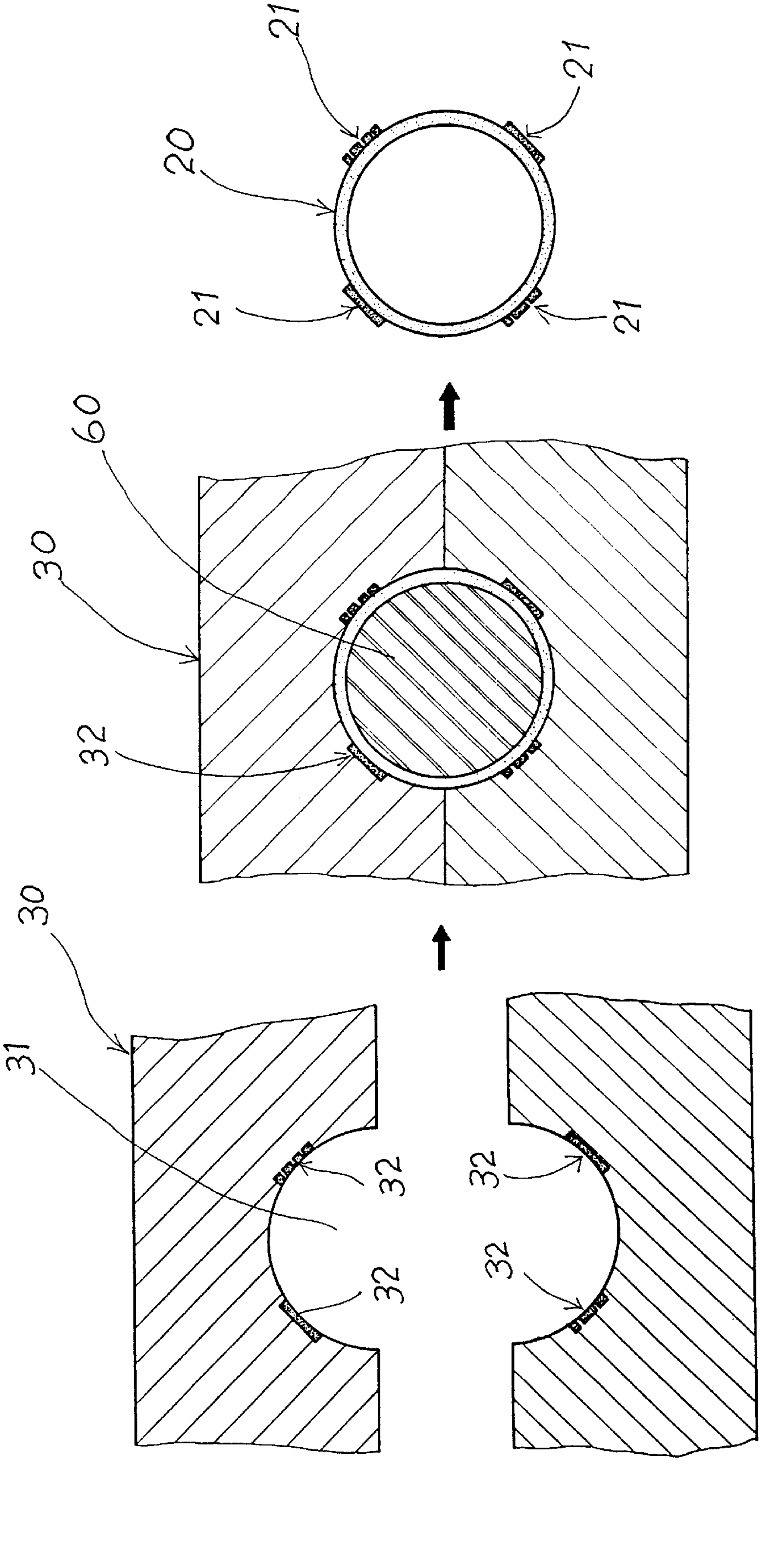
FIG. 12 illustrates the use of the method of the present invention to produce soft casing sleeves having multi-colored and raised decorations angularly spaced on a circumferential outer surface thereof.

The present invention provides a method of forming this type of soft casing sleeve 20 having multi-colored and raised decorations 21. The method of the present invention mainly includes the following steps:

A. Preparing a mold 30 consisting of two symmetrical halves adapted to produce an article through injection molding of general soft plastic material;

B. Symmetrically forming one or more mold cavities 31 at inner sides of the two halves of the mold 30;

C .Forming recesses 32 on surfaces of these mold cavities 31 at predetermined positions to form mirror images of selected letters, words or designs, as shown in FIGS. 3 and 4, such that an angle $\theta$ contained between two radii separately passing two circumferentially spaced sides of each recess 32, as indicated in FIG. 6, is controlled within a predetermined degree;

D. Laying the half of the mold 30 having recesses 32 formed on the mold cavities 31 in a horizontal position, so that the recesses 32 are located at a horizontally lowest position relative to the mold cavities 31 in which the recesses 32 are formed, as shown in FIG. 4;

E. Injecting differently colored soft plastic materials 40 into the recesses 32, care should be taken so that the soft plastic materials 40 would not overflow the recesses 32. The degree of the angle $\theta$ referred to in the Step C is one that would not cause the soft plastic materials 40 to overflow each recess 32 when the recess 32 is in the horizontally lowest position as defined in the above Step D. In the event any one angle θ is too large to avoid the overflow, injection of the colored soft plastic materials 40 is done in two or more steps to each time fill only a part of the recesses 32 in the circumferential direction of the mold cavities 31. When doing so, the one half of the mold 30 having the recesses 32 provided thereon shall be so positioned that the part of the recesses 32 that is to be filled with the colored soft plastic materials 40 each time should be located at the horizontally lowest position relative to the mold cavities 31 in which the recesses 32 are provided. By well controlling the time of injecting the soft plastic materials 40 into each part of the recesses 32 defined as the above-mentioned manner, decorations 21 so formed would be seamless in their appearances;

F. Closing the two halves of the mold 30 when the differently colored soft plastic materials 40 injected into the recesses 32 are set, as shown in FIGS. 5 and 6;

G. Turning the closed mold 30 with a suitable tool so that the mold 30 is in an upright position, as shown in FIG. 7;

H. Inserting a core rod 60 into each pair of mold cavities 31, as shown in FIG. 7; for a metal casing 11, a section of it that is to be coated with the soft sleeve 20 may be put around a suitable core rod 60 and then be inserted into one pair of mold cavities 31 along with the core rod 60;

I. Injecting another amount of differently colored soft plastic material 50 into clearances between the mold cavities 31 and core rods 60 or sections of the casings 11 put around of the core rods 60, as shown in FIGS. 8 and 9, so that a soft casing sleeve 20 is molded in each pair of the mold cavities 31. Since the soft plastic materials 40 and the soft plastic material 50 are basically the same type of material, the soft plastic material 50 injected into the mold cavities 31 in a molten state and the set soft plastic materials. 40 will still bond together to form an integral structure. That is, the raised decorations 21 are seamlessly connected to their corresponding soft casing sleeve 20 to form an integral body without the risk of separating from the soft casing sleeve 20;

J. Removing the core rods 60 and/or the casing sections 11 put around the core rods 60 from the mold cavities 31 after the soft plastic material 50 is set, as shown in FIGS. 10 and 11;

K. Separating the two halves of the mold 30 to remove from the mold cavities 31 either individual soft casing sleeves 20 or individual casing sections 11 coated with soft casing sleeves 20 that have multi-colored and raised decorations 21 thereon.

Where there are a plurality of decorations 21 to be circumferentially spaced on the outer surface of each soft casing sleeve 20, multiple sets of recesses 32 are formed on the surfaces of the mold cavities 31 corresponding to these decorations 21 based on the same principle as described in the above Step C. The multiple sets of recesses 32 are then filled with the soft plastic materials 40 one by one in the same manner as described in the above Step E. The mold 30 must be differently oriented so that the set of recesses 32 in each mold cavity 31 that are to be filled with the soft plastic material 40 are always located at a horizontally lowest position relative to any other set of recesses 32 in the same mold cavity 31. The mold 30 can be re-oriented for injecting the soft plastic material 40 into next set of recesses 32 only when the soft plastic material 40 in the previous set of recesses 32 has set. By this way, the molded soft casing sleeves 20 may have multi-colored and raised decorations 21 angularly and/or axially spaced on the circumferential outer surface thereof.

What is claimed is:

1. A method for forming soft annular casing sleeves having multi-colored and raised decorations comprising the following steps:

A. Preparing a mold consisting of two symmetrical halves adapted to produce articles through injection molding of general soft plastic material;

B. Symmetrically forming plural mold cavities at inner sides of each of the two halves of said mold;

C. Forming a plurality of sets of recesses on surfaces of said mold cavities of one of said halves of said mold at predetermined positions to form mirror images of selected letters, words or design with said plurality of sets of recesses angularly spaced on said surfaces of said mold cavities to form said selected letters, words or design on circumferential outer surface of said soft annular casing sleeve;

D. Laying the half of said mold having said recesses formed in said mold cavities in a horizontal position, so that a first part of said recesses is located at a horizontally lowest position relative to said mold cavities in which said recesses are formed;

E. Injecting differently colored soft plastic materials into said recesses at the horizontally lowest position;

F. Orienting said mold differently so that additional parts of said plurality of sets of recesses are one by one positioned at a horizontally lowest position relative to any other parts of said recesses in the same mold cavity at an interval determined by a time needed for said differently colored soft plastic materials to set in said recesses, and sequentially injecting said differently colored soft plastic materials into each part of said plurality of sets of recesses that have been positioned to the horizontally lowest position in said mold cavities;

G. Closing the two halves of said mold when said differently colored soft plastic materials injected into said recesses are set;

H. Turning said closed mold with a suitable tool so that said mold is in an upright position;

I. Inserting a core rod into each pair of said mold cavities;

J. Injecting another amount of differently colored soft plastic materials into clearances between said mold cavities and said core rods, so that a soft casing sleeve is molded in each pair of said mold cavities;

K. Removing said core rods from said mold cavities after said another amount of soft plastic material has set; and L. Separating the two halves of said mold to remove from said mold cavities individual soft casing sleeves that have multi-colored and raised decorations thereon.

* * * * *

UNITED STATES PATENT AND TRADEMARK OFFICE

CERTIFICATE OF CORRECTION

PATENT NO. : 6,479,005 B1
DATED : November 12, 2002
INVENTOR(S) : Ming-Jen Hsieh It is certified that error appears in the above-identified patent and that said Letters Patent is hereby corrected as shown below:

Title page,
Item [76], Inventor, name should read -- Ming-Jen Hsieh --

Signed and Sealed this

Sixteenth Day of September, 2003

JAMES E. ROGAN
*Director of the United States Patent and Trademark Office*